United States Patent [19]

De Sieno

[11] 4,264,217
[45] Apr. 28, 1981

[54] TEXT EDITOR

[76] Inventor: Duane D. De Sieno, 1251 Parker Pl., San Diego, Calif. 92109

[21] Appl. No.: 927,131

[22] Filed: Jul. 21, 1978

[51] Int. Cl.³ .............................................. B41J 3/46
[52] U.S. Cl. .................................... 400/63; 400/474; 364/900
[58] Field of Search .................... 364/900; 400/62, 63, 400/110, 61, 472–474, 89, 90

[56] References Cited

U.S. PATENT DOCUMENTS

| 3,029,919 | 4/1962 | Stine | 400/474 |
|---|---|---|---|
| 3,340,985 | 9/1967 | Sinila | 400/473 |
| 3,403,225 | 9/1968 | Mislan et al. | 400/63 |
| 3,611,308 | 10/1971 | Grinnell | 400/474 |
| 3,757,920 | 9/1973 | Wolf et al. | 400/62 |
| 3,820,644 | 6/1974 | Yeh | 400/110 |
| 4,016,365 | 4/1977 | Staar | 400/62 |
| 4,026,403 | 5/1977 | Inose et al. | 400/61 |
| 4,087,852 | 5/1978 | Campbell et al. | 400/63 |
| 4,096,578 | 6/1978 | Malkemes | 364/900 |
| 4,146,336 | 3/1979 | Hasenbalg | 400/61 |

FOREIGN PATENT DOCUMENTS

| 1405048 | 9/1975 | United Kingdom . |
|---|---|---|
| 1408135 | 10/1975 | United Kingdom . |
| 1408205 | 10/1975 | United Kingdom . |
| 1430483 | 3/1976 | United Kingdom . |

Primary Examiner—William Pieprz
Attorney, Agent, or Firm—Brown & Martin

[57] ABSTRACT

A text editing device has an input keyboard with data keys and control keys. A digital controller couples to the keyboard for receiving input signals representative of the keys as they are manually depressed, for storing digital data words representative of the depressed data keys, and for performing predetermined editing operations on the data words in response to the depressed control keys. The editing operations produces edited data words. An electromechanical keypusher is coupled to receive the output signals. The keypusher mounts on any office typewriter and depresses keys thereon corresponding to the edited data words represented by the output signals.

8 Claims, 20 Drawing Figures

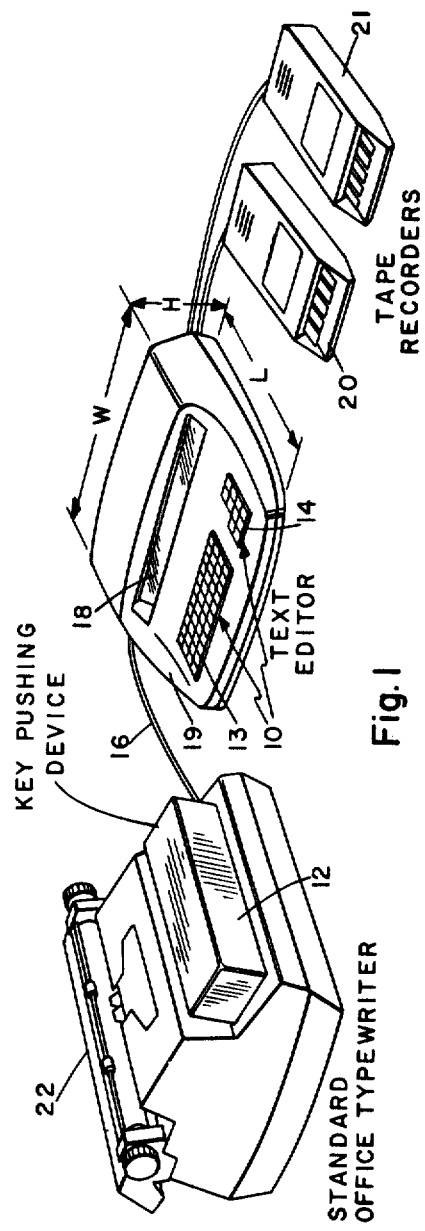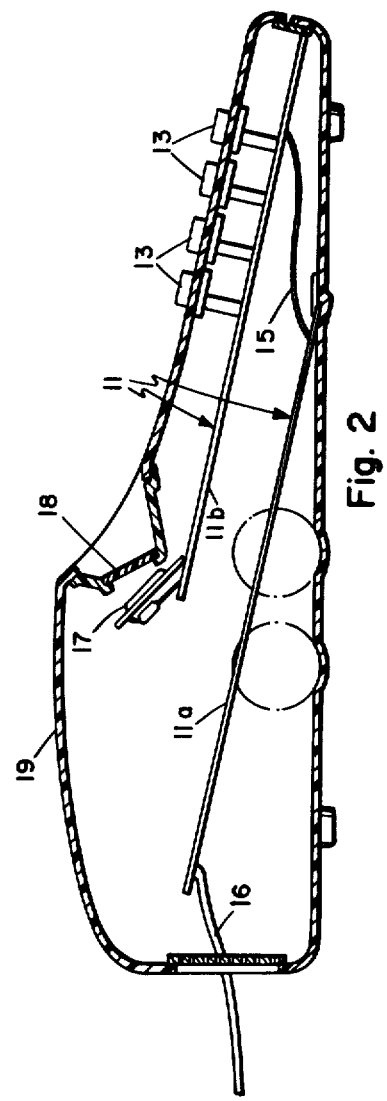

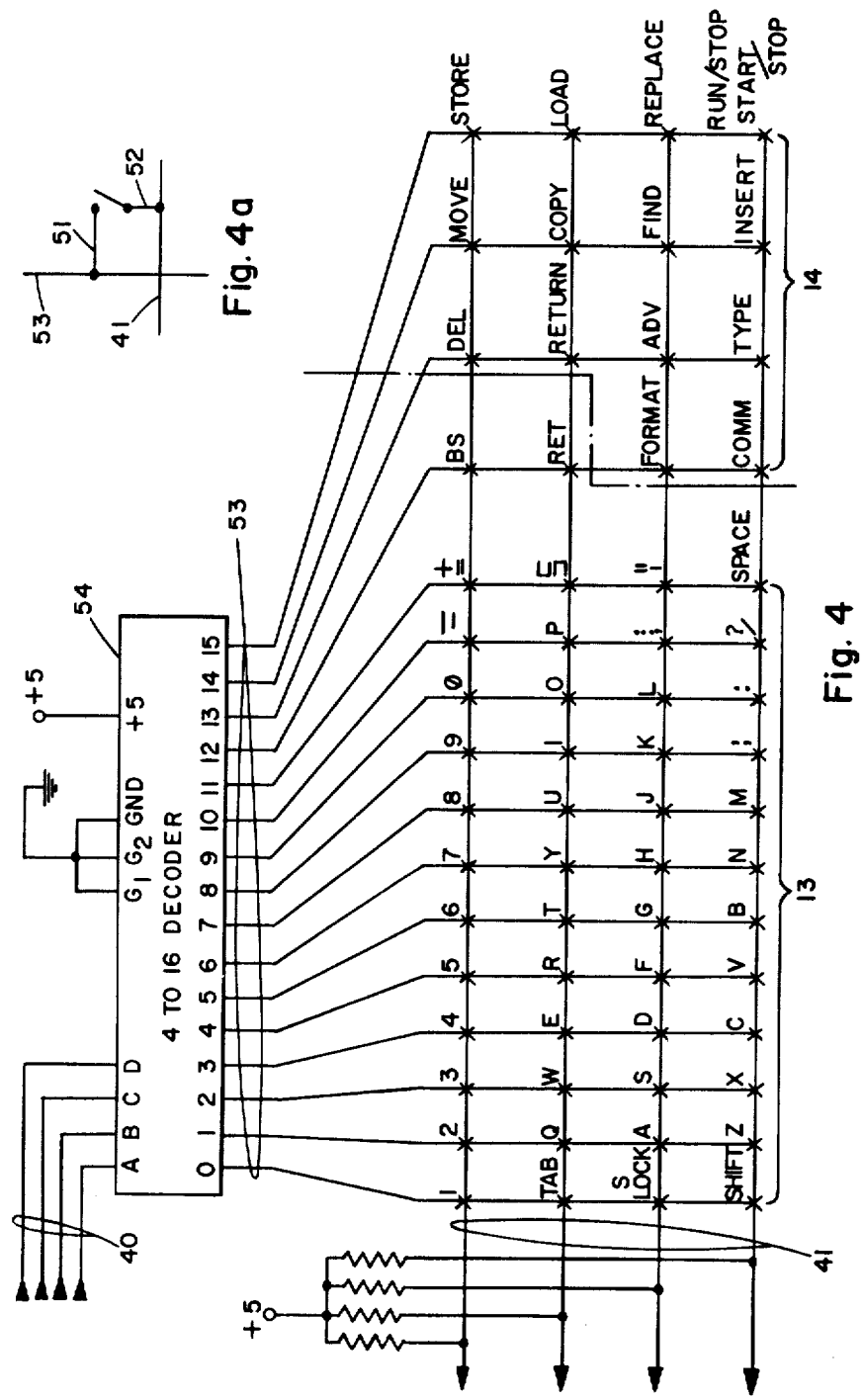

TEXT EDITOR

BACKGROUND OF THE INVENTION

The disclosed invention relates to electronic data processing equipment, and more specifically to digital text editors. Basically, digital text editing equipment allows an operator to type text in a rough draft, and then to easily modify the draft by various editing operations such as adding words, deleting sentences, moving paragraphs, etc. This editing is all performed electronically on digital data words that are stored in a memory and represent the rough draft. After the editing is complete, an output device is provided by which the edited data words in memory are converted to printed text.

One problem with prior art text editors, however, is that they all include their own special purpose output printer for converting the edited data words to printed text. Not only are these printers expensive, but typically they do not print with the same style characters as other typewriters which already exist in the office where the text editor is to be used. As a result, prior art text editors are relatively expensive; and further they are not suitable for typing documents partly thereon and partly on other typewriters.

Another problem with prior art text editors is that they are not portable. Typically, prior art text editors are packaged as an office desk. A portion of the desk contains the logic control electronics which performs the text editing and controls the input keyboard and output printer. This packaging is undesirable in that all text editing must be performed at the one fixed location of the text editing desk. Further, the device is not suitable for performing text editing away from the office, such as in a motel room during a business trip.

Still another problem with the prior art text editors is that they do not edit text of more than one language. For example, a text editor designed to edit English, cannot be readily adapted—if at all—to also edit text of a non-English language. Thus to perform editing on "N" different languages requires "N" different text editors.

Prior art text editors also typically include means for writing the data words onto magnetic tape. The magnetic tapes provide a temporary storage for the data words, and enables it to be edited at a later date. Various circuits exist in the prior art for recording digital data on magnetic tape. However, the reliability of the recording generally is directly related to the complexity of the recording means. It is therefore desirable to devise a simple circuit for reliably recording digital data on magnetic tape.

Accordingly, one object of the invention to provide a text editing device which will print with the same style characters as on all other typewriters which pre-exist in the office where the text editor is to be used.

Another object of the invention is to provide a text editor that is portable and suitable for use away from the office.

Another object of the invention is to provide a text editor that edits text of more than one language.

still another object of the invention is to provide a text editor having simple circuitry for reliably recording digital data on magnetic tape.

SUMMARY OF THE INVENTION

These and other objects are accomplished by a text editing device constructed according to the invention which is comprised of an input keyboard, a digital controller, and a mechanical keypusher. The keyboard provides a means for sending data input signals and control input signals to the controller. The controller stores the data input signals in the form of digital data words; and it performs text editing operations on the digital data words to thereby generate edited data words in response to the control input signals. The keypusher is coupled to the controller and receives output signals from the controller representative of the edited data words. In response thereto, the keypusher pushes keys on any typewriter which exists in the office where text editing is to be performed. That is, the device has no special purpose output printer of its own; but instead provides a means for performing text editing on pre-existing office typewriter of any kind. Accordingly, the text editor is both relatively inexpensive and prints with the same style characters as all other typewriters in the user's office.

Further, the input keyboard and digital controller of the text editor are physically packaged in a single hand-held portable case. This packaging is made feasible by the overall architecture of the controller—which includes the format of the editing input commands, the division of the task of implementing these commands between hardware and microcode, and the interfacing between the controller and the keyboard, the keypusher, and magnetic tape. Since the text editor is portable, an operator can perform text editing away from the office, as for example at home or in a motel room while on a business trip.

Further, the device is capable for performing editing on text of more than one language. This capability is provided by including alterable digital decoders in the keypusher. These decoders receive the output signals from the controller, and translate them into alterable key selection signals which operate to select the key to be pushed. Accordingly, the output signals can be made to push keys in one manner on one typewriter, and in another manner on a second typewriter.

The controller also includes improved digital recording circuitry. This circuitry is comprised of an integrator serially connected to a filter. In operation, the controller sends bit serial digital signals to the integrator. These signals are generated with varying pulse widths such that the integral of the signal is a quantitized frequency modulated analog signal with the digital information being encoded in the modulation. The filter smooths this quantitized signal into an analog signal consisting of only the desired modulation frequency.

DESCRIPTION OF THE DRAWINGS

Specific embodiments of the invention, as well as various features and advantages thereof, will best be understood by reference to the following detailed description when read in conjunction with the accompanying drawings wherein:

FIG. 1 is a pictorial view of a text editor constructed according to the invention.

FIG. 2 is a cross-sectional view of the text editor of FIG. 1.

FIG. 4 is a detailed circuit diagram of the input keyboard of FIG. 3.

Figure 3:
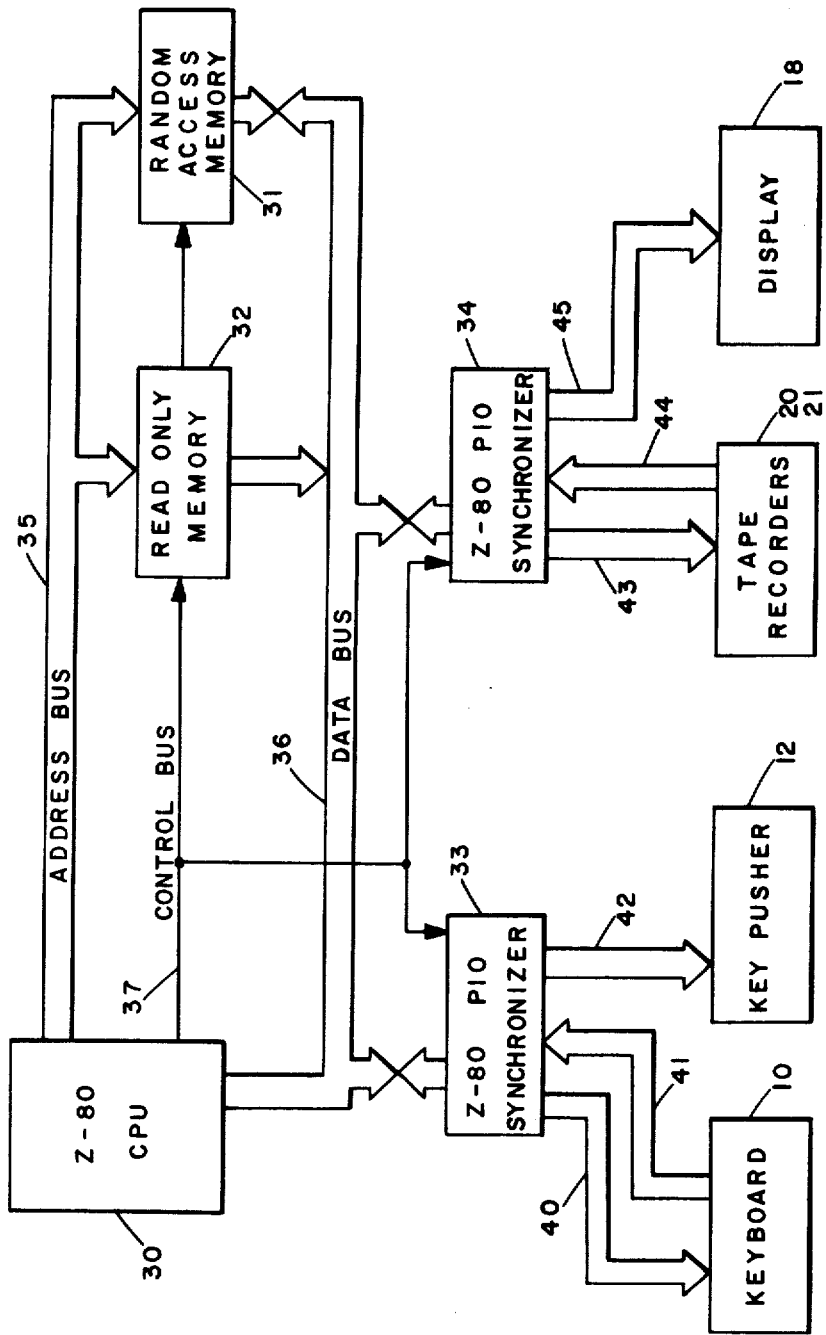
FIG. 3 is a block diagram of the electronics within the text editor of FIG. 2.

Table 1 is a listing of the code for the read only memory of FIG. 3.

DETAILED DESCRIPTION OF PREFERRED EMBODIMENTS

Referring now to FIGS. 1 and 2, a preferred embodiment of a text editing device constructed according to the invention will be described. Basically, the text editing device includes an input keyboard 10, a digital controller 11, and an electromechanical keypusher 12. Keyboard 10 has data keys 13 and control keys 14. These keys respectively generate data input signals and control input signals which represent the particular individual keys as they are manually depressed.

Controller 11 includes printed circuit boards 11a and 11b. These boards are interconnected via a cable 15. Board 11b couples to keyboard 10 to provide a means for controller 11 to receive the data input signals and control input signals. Controller 11 stores the data input signals as digital data words; and performs predetermined editing operations of the data words in response to the control input signals to thereby generate edited data words. One preferred architecture for the electronics of controller 11 that is packaged on boards 11a and 11b and performs the editing operations is illustrated in FIG. 3 and will be described shortly. Also, the editing operations which controller 11 performs will be described shortly in conjunction with FIGS. 4 and 5.

Controller 11 also generates output signals representative of the edited data words. A cable 16 couples these output signals to keypusher 12. The keypusher is mountable on any office typewriter 22 as illustrated in FIG. 1. In operation, keypusher 12 depresses keys on typewriter 22 corresponding to the edited data words which are represented by the output signals. Details of one preferred keypusher is illustrated and described in conjunction with FIG. 6.

One important feature of the disclosed device is that it provides a means for performing text editing operations while retaining the character style of hundreds of thousands of presently existing typewriters. This text editing is performed by first entering text via data keys 13 into controller 11. After the text is entered, the control keys 14 allow the text to be edited. For example, various bits of text such as characters, words, lines, sentences, paragraphs, or pages can be added or deleted by means of keys 14. Then after the editing is complete, the edited words may be printed on any office typewriter 22. This is accomplished by mounting keypusher 12 on typewriter 22, and depressing a type key that is contained within keys 14. In this manner, the character style of the existing typewriter is incorporated into the edited text.

Another important feature of the disclosed device is that it is portable. That is, keyboard 10, controller 11, and display 17 are physically packaged in a portable case 19. This case has dimensions L, W, and H as illustrated in FIG. 1 of only 13", 19", and 4". Also, case 19 weighs only approximately 10 pounds with the logic boards 11a and 11b contained therein. Accordingly, the disclosed device is suitable for use away from the office—such as at home or in a motel room on a business trip.

The disclosed device also includes two tape interfaces which provide a means for controller 11 to read data from and write data to cassette tape recorders 20 and 21 respectively. Thus the disclosed device, though portable, has a large memory storage capacity and can edit large documents. The interfaces to tapes 20 and 21 are described in detail in conjunction with FIG. 8a-8e. These interfaces provide a new and improved circuit for recording data on the tapes.

Referring next to FIG. 3, the electronics of controller 11 will be described. These electronics include a microprocessor 30, a random access memory 31, a read only memory 32, and input/output synchronizers 33 and 34. An address bus 35 connects processor 30 to memories 31 and 32 to thereby provide a means for processor 30 to address particular locations within the memories. Similarly, a data bus 36 connects processor 30 to memories 31 and 32 to thereby provide a means for processor 30 to receive/store information in the memories. Memory 31 holds the data words and edited data words which processor 30 operates on; while memory 32 holds the microcode for processor 30. Data bus 36 also connects to synchronizers 33 and 34. These synchronizers provide a means for processor 30 to send and receive signals to the input/output devices connected thereto.

The chips comprising one preferred embodiment of the FIG. 3 controller are as follows. Processor 30 is a Z-80 computer. It executes 8 bit instructions and is contained on single semiconductor chip. This chip has 16 outputs which comprise address bus 35; and has eight input/outputs which comprise data bus 36. Memory 31 is comprised of 48 RAM chips arranged in a six by eight array. Each of these is a 2102 chip, which has 1K bits of storage. Thus the array has 6K bytes of storage. Memory 32 is comprised of 5 ROM chips arranged in a five by one array. Each of these is a 82S181 chip, which has a 1K bytes of storage. Thus this array has 5K bytes of instructions. Synchronizers 33 and 34 are each comprised of a single Z80 APIO chip. These chips have 8 input/output pins which connect to bus 36; and also have 16 input/output pins which are connected via lead 40–45 to various I/O devices as illustrated in FIG. 3. Also included in processor 30 are nine control outputs which are illustrated in FIG. 3 as control bus 37. Signals on this bus provide a binary code which selects either RAM31, ROM32, synchronizer 33, or synchronizer 34. These signals also select either a read mode or write mode for RAM31; and select an input mode or output mode for synchronizers 33 and 34.

Details of the coupling between synchronizer 33 and keyboard 10 will now be described in detail in conjunction with FIG. 4. The interconnections illustrated therein is contained on circuit board 11b. Leads 40 and 41 connect board 11b to the synchronizer on board 11a via cable 15. The data keys 13 illustrated in FIG. 4 include all the keys of any standard typewriter. In comparison, the control keys are additional keys that are utilized to perform text editing operations. The specific kind of editing which each of the keys 14 cause to be performed will be described shortly in conjunction with FIGS. 5a through 5f.

Each of the keys 13 and 14 provides a pair of electrical contacts 51 and 52 as illustrated in FIG. 4a. Contacts 51 and 52 are interconnected in a 4×16 row-column array. Leads 41 make the row interconnections; while leads 53 make the column interconnections. A four bit decoder chip 54 has inputs coupled to leads 40, and outputs coupled to leads 53. To determine if a particular key is depressed, processor 30 generates a four bit binary code of 0 to 15 on leads 40 corresponding to the column line that connects to the particular key, and simultaneously interrogates the row line that connects to that key.

When any of the data keys are sensed by processor 30 as being depressed, the processor stores digital data words in memory 31 which represents the depressed data keys. In comparison, when control keys are sensed by processor 30 as being depressed, the processor performs predetermined editing operations on the stored data words. The various types of text editing which processor 30 performs will now be described in conjunction with FIGS. 5a-5f.

Figure 5A:
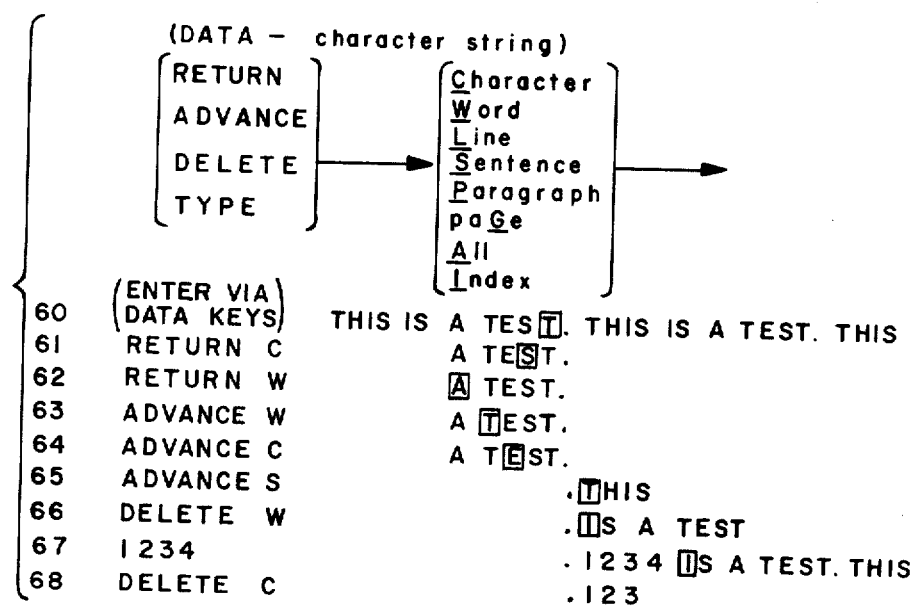
FIGS. 5a-5f illustrate the formats of the text editing commands which are entered via the keyboard of FIG. 4.

FIG. 5a illustrates the general format of how the control keys labeled RETURN, ADVANCE, DELETE, and TYPE are utilized to edit stored words. Also included therein are specific examples of their use. In general, the RETURN, ADVANCE, DELETE, and TYPE keys are each used in conjunction with data keys C, W, L, S, P, G, A, and I. For example, the sequence of RETURN C is used to move the place at which text is to be inserted backwards one character. This is illustrated at line 61 in FIG. 5a. The square symbol in this Figure represents a flashing cursor which indicates the character behind which text would be entered by depressing data keys. See lines 66-67 of FIG. 5a for example.

Similarly, the sequence RETURN W is used to move backwards one word; ADVANCE W is used to move forward one word. ADVANCE C is used to move forward one character, and ADVANCE S is used to move forward one sentence. These are illustrated at lines 62, 63, 64 and 65 respectively. Also, the sequence DELETE W is used to delete a word; while DELETE C is used to delete a character. These operations are illustrated at lines 66 and 68. Further, the sequence TYPE L is used to type a line; and TYPE P is used to type a paragraph.

In order to perform the above described editing operations on the stored data words, processor 30 must be able to identify a character, a word. . . and so forth. To this end, each byte in memory 31 represents one character. A word is detected as a set of characters followed by a space, or a period and a space. The end of each line is calculated by processor 30. It is told via the FORMAT key (which is described infra) how many character locations exist per line. Sentences are detected as a string of characters followed by a period and a space. Paragraphs are detected as a string of characters followed by a RETURN SPACE SPACE or RETURN TAB or COMMAND P. The end of each page is calculated by processor 30. It is also told via the FORMAT key how many lines exist per page. TAB is also calculated by processor 30, since the FORMAT key defines the TAB settings. Other character strings may also be detected as words, sentences, etc.

Figure 5B:
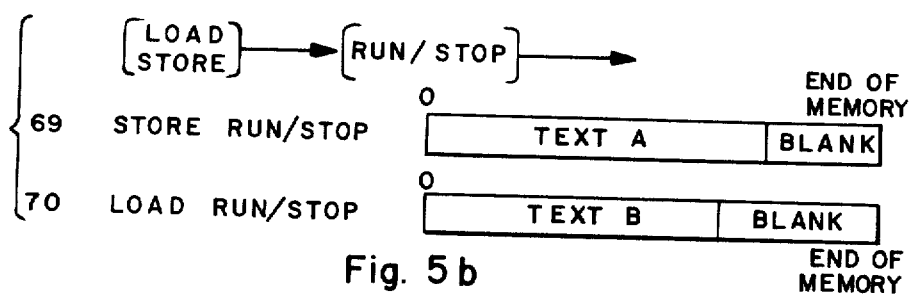

FIG. 5b illustrates the general format for the LOAD and STORE control keys. It also illustrates specific examples of their use. Basically, these keys are used in conjunction with the RUN/STOP key to move data words from memory 31 to tape 20, and to move data words from tape 21 to memory 31. For example, the sequence STORE RUN/STOP operates to write all the data words in memory 31 onto tape 20. If memory 31 is not full of data words, characters representing blanks are written at the empty locations as indicated at line 69. Similarly, the sequence LOAD RUN/STOP operates to write the contexts of tape on recorder 21 into memory 31. Blanks fill memory 31 if the tape being read is less than 6000 bytes long, as indicated at line 70.

Figure 5C:

The format for using the FIND key is illustrated in general in FIG. 5c. This key provides the capability to search the data words in memory 31 for any string of characters, and to define the beginning of that string on the place at which text would be entered by subsequently depressing data keys. This capability is activated by the key sequence that is indicated at line 71. Also as therein indicated, subsequent depressions of the RUN/STOP key will activate processor 30 into performing another search for the same string in the text which sequentially follows in memory. Each time the specified string is found, processor 30 displays the data words containing the string and also displays characters adjacent thereto via display 18. Processor 30 also highlights the displayed string by flashing those characters which comprise it.

The FIND key also provides the capability to search the data words in memory 31 for any strings and to automatically replace those words with other text. This capability is activated by the key sequence indicated at line 72. By this sequence, every string of data words in memory 31 which matches the specified string is replaced by the specified text. For example, if the specified string is TRANSDUCER and the specified text is TRANSPONDER, then every occurrence of transducer in memory 31 is replaced with transponder.

Figure 5D:
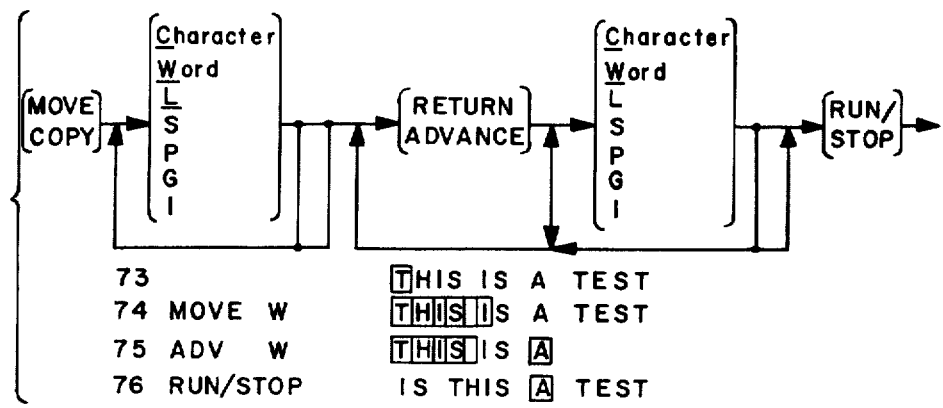

Additional text editing capability is provided by the MOVE and COPY keys. These are utilized in conjunction with data keys C, W, L, S, P, G and I and control keys RETURN, ADVANCE, and RUN/STOP as illustrated in FIG. 5d. A specific example of the use of the MOVE key is also illustrated therein. In this example, the word THIS is interchanged with the word IS by the sequence MOVE W ADVANCE W RUN/STOP. Lines 73-75 illustrate this sequence. Clearly, many other specific key sequences are possible, as the general format of FIG. 5d illustrates.

The COPY operation is similar to the MOVE operation. In the COPY operation however, the string that is specified immediately after depressing the COPY key, is left in place as well as being moved to the new position which is specified following the RETURN or ADVANCE keys. Thus, the sequence COPY W ADVANCE W RUN/STOP performed on the text of line 73 would result in the text THIS IS THIS A TEST.

Figure 5E:
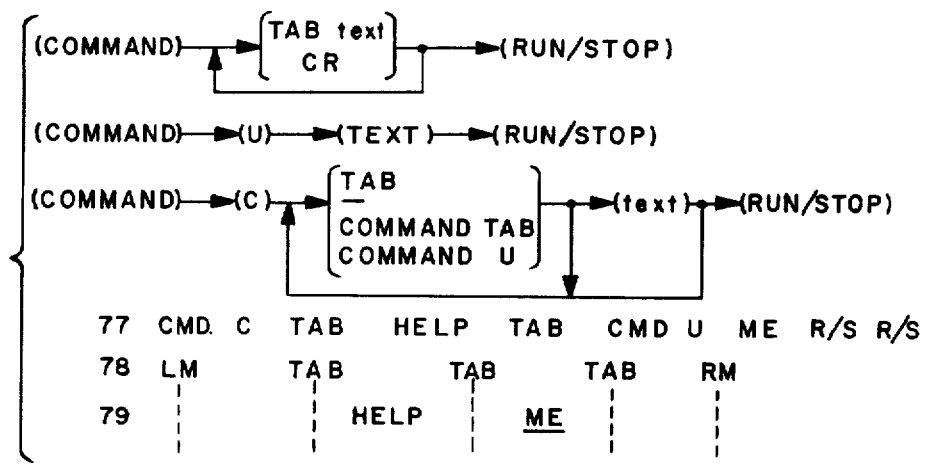
Figure 5F:
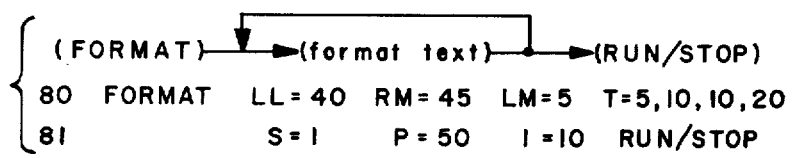

FIG. 5e illustrates several formats for the COMMAND key, and also illustrates a specific example of how to use the format. Basically, all of the COMMAND key sequences specify operations that are to be performed during type out, as opposed to being performed immediately. For example, the sequence COMMAND TAB 13.5 TAB 115.0 TAB 0.1 RUN/STOP will, during type out, align the decimal points within the numbers of 13.5, 115.0, and 0.1 with three previously specified TAB settings. Similarly, the sequence COMMAND CR CR RUN/STOP will, during type out, perform two carriage returns. Further, the sequence COMMAND U followed by text and RUN/STOP will, during type out, underline the text that exists between the letter U and the occurrence of RUN/STOP.

Lines 77, 78, and 79 illustrate an example of how the COMMAND key is used to produce centered text or centered underlined text during type out. The key sequence is illustrated at line 77, and the result produced during type out is illustrated at lines 78 and 79. All calculations that are required to perform this text centering are performed by processor 30. These calculations are based on TAB settings and line lengths which were previously entered by the FORMAT key as described below.

A wide variety of information concerning the format of text to be typed is entered via the FORMAT key. This information is entered by a sequence, as indicated at lines 80 and 81. Specifically, the sequence LL=40 sets the line length to 40; RM=45 sets the right margin to 45; LM=5 sets the left margin to 5; T=5, 15, 25, 45 sets the tabs to 5, 15, 25, and 45; S=1 sets the line spacing to 1; P=50 sets the page length to 50 lines; and I=10 sets the indentation of each paragraph to 10 spaces. The numbers used above are only exemplary. Other numbers may be used as desired. These numbers are stored in memory 31 and recalled by processor 30 as needed to perform the various editing functions. Table I is a listing of the code for the Z80 computer that performs a representative sample of the above described functions.

TABLE I

| Memory Address | Memory Code | | | | | | | | | | | | | | | |
|---|---|---|---|---|---|---|---|---|---|---|---|---|---|---|---|---|
| 0000 | 21 | 00 | 2b | f9 | eb | c3 | 6e | 00 | ff | ff | ff | ff | ff | ff | ff | ff |
| 0010 | ff | ff | ff | ff | ff | ff | ff | ff | 00 | 1d | 20 | fc | 15 | 20 | p9 | c9 |
| 0020 | ff | ff | ff | ff | ff | ff | ff | ff | ff | ff | ff | ff | ff | ff | ff | ff |
| 0030 | ff | ff | ff | ff | ff | ff | ff | ff | ed | 73 | 66 | 2b | 31 | 66 | 2b | f5 |
| 0040 | c5 | d5 | e5 | d9 | 08 | f5 | c5 | d5 | e5 | dd | e5 | fd | e5 | ed | 57 | 47 |
| 0050 | ed | 5f | 4f | c5 | 2a | 66 | 2b | 4e | 23 | 46 | c5 | ed | 7b | 66 | 2b | e1 |
| 0060 | e5 | 2b | 22 | c0 | 2b | cd | db | 02 | c3 | 95 | 00 | c3 | 85 | 83 | 21 | 00 |
| 0070 | 83 | 01 | 00 | 01 | ed | b0 | 21 | 6d | 83 | 3e | 06 | 46 | 23 | 43 | 23 | ed |
| 0080 | b3 | 3d | 20 | f7 | 2a | c0 | 2b | cd | 00 | 80 | 3a | df | 2b | cb | af | 32 |
| 0090 | df | 2b | cd | 5f | 03 | cd | bc | 00 | fe | ff | 28 | 11 | cd | 14 | 83 | 11 |
| 00a0 | db | 2b | 2a | d8 | 2b | cd | f5 | 82 | 11 | ad | 00 | d5 | e9 | ed | 5b | d6 |
| 00b0 | 2b | cd | 18 | 00 | 21 | 10 | 02 | 22 | d6 | 2b | 18 | d9 | ed | 4b | dc | 2b |
| 00c0 | ed | 5b | de | 2b | 21 | c5 | 2b | cb | 6e | 28 | 06 | 0e | 80 | cb | ba | 18 |
| 00d0 | 06 | 0d | 20 | 03 | cb | fa | 0c | 05 | 3e | 40 | b8 | 28 | 08 | af | b8 | 20 |
| 00e0 | 06 | cb | b2 | 18 | 02 | cb | f2 | ed | 43 | dc | 2b | ed | 53 | de | 2b | cd |
| 00f0 | 43 | 01 | cd | f9 | 00 | 32 | da | 2b | c9 | 06 | 10 | 21 | c2 | 2b | 78 | d3 |
| 0100 | 08 | db | 08 | e6 | f0 | 57 | 2f | a6 | 72 | 4f | 20 | 0e | 23 | 10 | ef | 3e |
| 0110 | ff | c9 | cb | ce | 18 | f9 | cb | 8e | 18 | f5 | 78 | e6 | 0f | cb | 21 | 38 |
| 0120 | 04 | c6 | 10 | 18 | f8 | 21 | df | 2b | fe | 20 | 28 | e6 | fe | 30 | 28 | e6 |
| 0130 | cb | 4e | 20 | 0c | 21 | c2 | 2b | cb | 6e | 28 | 05 | cb | 66 | 28 | 01 | c9 |
| 0140 | c6 | 40 | c9 | ed | 5b | d4 | 2b | 21 | e0 | 2b | 06 | 20 | 7a | f6 | 08 | d3 |
| 0150 | 04 | 7e | cb | 7f | 28 | 0d | 08 | 3a | df | 2b | cb | 77 | 20 | 03 | 08 | 18 |
| 0160 | 02 | 3e | 3f | e6 | 7f | d3 | 09 | f6 | 80 | d3 | 09 | d3 | 09 | d? | 09 | d3 |
| 0170 | 09 | d3 | 09 | d3 | 09 | d3 | 09 | 23 | 10 | d7 | 7b | f6 | 00 | d3 | 04 | 1d |
| 0180 | 15 | 14 | 28 | 06 | 15 | ed | 53 | d4 | 2b | c9 | 3a | df | 2b | cb | 7f | 20 |
| 0190 | 08 | 11 | 04 | 04 | ed | 53 | d4 | 2b | c9 | 16 | 04 | 7b | c6 | 05 | 5f | 28 |
| 01a0 | 06 | 1d | ed | 53 | d4 | 2b | c9 | 21 | af | 01 | e5 | 2a | d2 | 2b | e9 | 11 |
| 01b0 | 08 | 04 | ed | 53 | d4 | 2b | c9 | 2a | c0 | 2b | 23 | 22 | c0 | 2b | 06 | 01 |
| 01c0 | cd | 5f | 03 | c9 | 2a | c0 | 2b | 2b | 18 | f1 | 2a | c0 | 2b | cd | 00 | 80 |
| 01d0 | 23 | 10 | fd | 22 | c0 | 2b | cd | 00 | 80 | cd | 5f | 03 | c9 | 2a | c0 | 2b |
| 01e0 | 54 | 5d | 24 | 2e | 00 | 00 | b7 | ed | 52 | 44 | 4d | 62 | 6b | 23 | ed | b0 |
| 01f0 | 2a | c0 | 2b | c3 | bb | 01 | 2a | c0 | 2b | 54 | 5d | 24 | 2e | 00 | e5 | b7 |
| 0200 | ed | 52 | 44 | 4d | e1 | 54 | 5d | 2b | ed | b8 | 2a | c0 | 2b | 3e | 00 | 77 |
| 0210 | c3 | bb | 01 | cd | 26 | 02 | cd | 00 | 82 | c9 | cd | 26 | 02 | cd | 9d | 81 |
| 0220 | 2a | c0 | 2b | c3 | bb | 01 | cd | a4 | 80 | 2a | c0 | 2b | 3a | db | 2b | 84 |
| 0230 | 57 | 5d | 3e | 08 | d3 | 04 | c9 | cd | a4 | 80 | 3a | db | 2b | 2a | c0 | 2b |
| 0240 | 06 | 80 | ed | b1 | 2b | 22 | c0 | 2b | cd | 00 | 80 | cd | 5f | 03 | c9 | 3e |
| 0250 | f8 | d3 | 05 | cd | bc | 00 | ed | 5b | d6 | 2b | cd | 18 | 00 | 3a | da | 2b |
| 0260 | fe | 3f | 20 | eb | 3e | 08 | d3 | 04 | cd | d1 | 80 | c3 | 76 | 81 | cd | f7 |
| 0270 | 81 | cb | ee | 2a | c0 | 2b | cd | d3 | 01 | 06 | 40 | c5 | cd | ca | 01 | 01 |
| 0280 | 10 | f9 | 21 | df | 2b | cb | ae | c3 | ca | 01 | cd · | a4 | 80 | 3a | db | 2b |
| 0290 | 2a | c0 | 2b | 67 | 22 | c0 | 2b | cd | 00 | 80 | cd | 5f | 03 | cd | a4 | 80 |
| 02a0 | 3a | db | 2b | 2a | c0 | 2b | 6f | 22 | c0 | 2b | cd | 00 | 80 | cd | 5f | 03 |
| 02b0 | c9 | 2a | c0 | 2b | 7e | fe | ff | 28 | 05 | 3e | 08 | d3 | 04 | e9 | 31 | 50 |
| 02c0 | 2b | c1 | 79 | cd | 4f | 78 | ed | 47 | fd | e1 | dd | e1 | el | d1 | c1 | f1 |
| 02d0 | 08 | d9 | e1 | d1 | c1 | f1 | ed | 7b | 66 | 2b | c9 | 11 | e0 | 2b | 3a | 4f |
| 02e0 | 2b | cd | 98 | 03 | 3a | 4e | 2b | cd | 98 | 03 | 3e | 3b | cd | b2 | 03 | 21 |
| 02f0 | 65 | 2b | cd | 3d | 03 | 3a | 67 | 2b | cd | 98 | 03 | 3a | 66 | 2b | cd | 98 |
| 0300 | 03 | 3e | 3b | cd | b2 | 03 | 3e | 3b | cd | b2 | 03 | c9 | 11 | e0 | 2b | 3a |
| 0310 | 55 | 2b | cd | 98 | 03 | 3a | 54 | 2b | cd | 98 | 03 | 3e | 3b | cd | b2 | 03 |
| 0320 | 3a | 53 | 2b | cd | 98 | 03 | 3a | 52 | 2b | cd | 98 | 03 | 3e | 3b | cd | b2 |
| 0330 | 03 | 21 | 5d | 2b | cd | 3d | 03 | 3e | 3b | cd | b2 | 03 | c9 | 06 | 02 | 7e |
| 0340 | cd | 98 | 03 | 3e | 3b | cd | b2 | 03 | 2b | 10 | f4 | 06 | 03 | 7e | cd | 98 |
| 0350 | 03 | 2b | 7e | cd | 98 | 03 | 3e | 3b | cd | b2 | 03 | 2b | 10 | ef | c9 | 11 |
| 0360 | e0 | 2b | 7c | cd | 98 | 03 | 7d | cd | 98 | 03 | 3e | 3b | cd | b2 | 03 | 7e |
| 0370 | 23 | cd | 98 | 03 | 3e | 3b | cd | b2 | 03 | 10 | f4 | 3a | df | 2b | cb | 6f |
| 0380 | 20 | 09 | 3e | 3b | 12 | 1c | 1d | c8 | 13 | 18 | f9 | 3e | 1c | cd | b2 | 03 |
| 0390 | 06 | 05 | cd | b2 | 03 | 10 | fb | c9 | f5 | 07 | 07 | 07 | cd | a1 | 03 |
| 03a0 | f1 | e6 | 0f | d9 | 21 | e8 | 03 | 4f | 06 | 00 | e5 | 09 | 5e | 23 | 56 | e1 |
| 03b0 | 7b | d9 | e5 | 21 | df | 2b | cb | 6e | 28 | 14 | d5 | d3 | 05 | 11 | 66 | 1a |
| 03c0 | cd | d2 | 03 | f6 | ff | d3 | 05 | 11 | e8 | 30 | cd | 18 | 00 | d1 | e1 | 12 |
| 03d0 | 13 | c9 | fe | 24 | c2 | 18 | 00 | cd | 18 | 00 | cd | fb | 03 | 3e | 3c | cd |
| 03e0 | b2 | 03 | 3e | 0c | cd | b2 | 03 | c9 | 09 | 00 | 01 | 02 | 03 | 04 | 05 | 06 |
| 03f0 | 07 | 08 | 21 | 35 | 33 | 23 | 13 | 24 | c3 | e7 | 81 | 3e | ff | c3 | b2 | 03 |

TABLE I-continued

| Memory Address | Memory Code | | | | | | | | | | | | | | | |
|---|---|---|---|---|---|---|---|---|---|---|---|---|---|---|---|---|
| 0400 | 3a | aa | 2b | fe | 20 | 38 | 15 | 47 | 3a | 7c | 2b | 4f | 3e | 10 | 91 | 30 |
| 0410 | 0b | 79 | c6 | 10 | 90 | 30 | 08 | 79 | d6 | 10 | 18 | 06 | af | 18 | 03 | 78 |
| 0420 | d6 | 20 | 32 | 6a | 2b | 2a | b8 | 2b | 3a | b7 | 2b | 22 | 8e | 2b | 32 | 90 |
| 0430 | 2b | cd | 00 | 84 | 21 | 6a | 2b | 3a | bc | 2b | 96 | 28 | 08 | 2a | a6 | 2b |
| 0440 | 3a | a5 | 2b | 18 | e6 | 21 | e0 | 2b | 3a | a3 | 2b | 77 | 4f | 3a | bc | 2b |
| 0450 | 47 | 3a | 7c | 2b | b8 | 20 | 02 | cb | fe | 23 | 3e | 1c | b9 | 28 | 15 | e5 |
| 0460 | 2a | a6 | 2b | 3a | a5 | 2b | 22 | 8e | 2b | 32 | 90 | 2b | cd | 00 | 84 | e1 |
| 0470 | af | bd | 20 | d4 | af | bd | 28 | 06 | 3e | 3b | 77 | 23 | 18 | f6 | c9 | 00 |
| 0480 | 2a | be | 2b | 22 | 8e | 2b | 22 | 74 | 2b | 3a | bd | 2b | 32 | 73 | 2b | 32 |
| 0490 | 90 | 2b | 21 | e0 | 2b | 06 | 20 | 00 | c5 | e5 | cd | 00 | 84 | 2a | a6 | 2b |
| 04a0 | 22 | 8e | 2b | 3a | a5 | 2b | 32 | 90 | 2b | e1 | c1 | 3a | a3 | 2b | 77 | 23 |
| 04b0 | 10 | e6 | 2a | a6 | 2b | 22 | 71 | 2b | 3a | a5 | 2b | cd | 98 | 05 | 2a | 6e |
| 04c0 | 2b | 11 | e0 | 2b | cd | f5 | 82 | e9 | 3a | 6d | 2b | cb | 47 | 28 | 16 | 2a |
| 04d0 | c0 | 2b | 22 | 80 | 2b | 2a | be | 2b | 22 | 7e | 2b | 2a | bc | 2b | 22 | 7c |
| 04e0 | 2b | cd | 00 | 04 | c9 | 2a | c0 | 2b | 22 | 7a | 2b | 2a | be | 2b | 22 | 78 |
| 04f0 | 2b | 2a | bc | 2b | 22 | 76 | 2b | cd | 50 | 05 | 18 | c2 | 3a | 6d | 2b | cb |
| 0500 | 47 | 28 | 2b | 2a | 6b | 2b | ed | 5b | a8 | 2b | b7 | ed | 52 | 28 | 0a | 2a |
| 0510 | 80 | 2b | b7 | ed | 52 | 28 | b8 | 18 | de | 2a | b4 | 2b | 22 | 80 | 2b | 2a |
| 0520 | b2 | 2b | 22 | 7e | 2b | 2a | b0 | 2b | 22 | 7c | 2b | c3 | 80 | 04 | 2a | a8 |
| 0530 | 2b | ed | 5b | 80 | 2b | 7 | ed | 52 | da | f7 | 04 | 2a | 7a | 2b | 22 | 80 |
| 0540 | 2b | 2a | 78 | 2b | 22 | 7e | 2b | 2a | 76 | 2b | 22 | 7c | 2b | c3 | e1 | 04 |
| 0550 | 21 | e1 | 2b | 11 | e0 | 2b | 01 | 20 | 00 | ed | b0 | 29 | a6 | 2b | 22 | 74 |
| 0560 | 2b | 3a | a5 | 2b | 32 | 73 | 2b | 2a | 71 | 2b | 22 | 8e | 2b | 3a | 70 | 2b |
| 0570 | 32 | 90 | 2b | cd | 00 | 84 | 2a | a6 | 2b | 22 | 71 | 2b | 3a | a5 | 2b | 32 |
| 0580 | 70 | 2b | 3a | a3 | 2b | 32 | ff | 2b | 2a | 74 | 2b | 22 | 8e | 2b | 3a | 73 |
| 0590 | 2b | 32 | 90 | 2b | cd | 00 | 84 | c9 | 32 | 70 | 2b | 2a | 74 | 2b | 22 | 8e |
| 05a0 | 2b | 3a | 73 | 2b | 32 | 90 | 2b | cd | 00 | 84 | c9 | 00 | 00 | 00 | 00 | 00 |
| 05b0 | 2a | a8 | 2b | ed | 5b | 88 | 2b | b7 | ed | 52 | c8 | 21 | b0 | 05 | e5 | 3a |
| 05c0 | a5 | 2b | 32 | 90 | 2b | 2a | a6 | 2b | 22 | 8e | 2b | cd | 00 | 84 | 2a | 8a |
| 05d0 | 2b | 22 | 86 | 2b | 21 | 01 | 01 | 22 | 84 | 2b | 3a | a3 | 2b | fe | 1c | 4f |
| 05e0 | 20 | 17 | 3a | bc | 2b | 2a | 86 | 2b | 54 | 5d | 19 | d6 | 05 | 30 | fb | 22 |
| 05f0 | 86 | 2b | 00 | 00 | 00 | 00 | 00 | 00 | 3a | 82 | 2b | b9 | 20 | 08 | 2a |
| 0600 | 8a | 2b | 22 | 84 | 2b | 18 | 18 | 21 | 82 | 2b | cb | 76 | 28 | 08 | cb | 71 |
| 0610 | 20 | 0d | 3e | 30 | 18 | 06 | cb | 71 | 28 | 05 | 3e | 20 | cd | 23 | 06 | 79 |
| 0620 | 32 | 82 | 2b | 2a | 84 | 2b | cd | 3e | 06 | e6 | 3f | d3 | 05 | 21 | 00 | 06 |
| 0630 | cd | 3e | 06 | 3e | ff | d3 | 05 | 2a | 86 | 2b | cd | 3e | 06 | c9 | 06 | 08 |
| 0640 | 10 | fe | 2d | 20 | f9 | 25 | 20 | f6 | c9 | 00 | 00 | 00 | 00 | 00 | 00 | 00 |
| 0650 | 44 | 5a | 56 | 56 | 46 | 56 | 56 | 55 | 52 | 42 | 44 | 45 | 00 | 00 | 00 | 00 |
| 0660 | 00 | 5a | 9e | 5a | 5a | 1a | 5a | 7b | 11 | 59 | 59 | 55 | 44 | 00 | 00 | 00 |
| 0670 | 00 | 00 | 00 | 00 | 00 | 00 | 00 | 00 | 00 | 01 | 02 | 03 | 14 | 16 | 1b |
| 0680 | 04 | 1e | 05 | 1e | 1e | 1e | 1e | 06 | 07 | 1e | 08 | 1e | 09 | 12 | 17 | 1a |
| 0690 | 1e | 0a | 0b | 1e | 1e | 0c | 1e | 1e | 1e | 0d | 1e | 1e | 11 | 13 | 19 | 1c |
| 06a0 | 1e | 1e | 1e | 0e | 1e | 1e | 1e | 1e | 1e | 1e | 0f | 10 | 15 | 18 | 1d |
| 06b0 | 2a | c0 | 2b | 7e | 32 | a3 | 2b | 23 | 22 | a8 | 2b | c9 | ff | 22 | 9b | 2b |
| 06c0 | 3a | de | 2b | cb | 5f | 28 | 0d | ed | 5b | 9f | 2b | 2a | aa | 2b | 19 | 22 |
| 06d0 | aa | 2b | eb | c9 | cd | cd | 87 | 2a | 9f | 2b | c9 | ff | ff | ff | ff | ff |
| 0800 | 3a | df | 2b | 4f | 06 | 20 | 2a | c0 | 2b | 11 | 10 | 00 | b7 | ed | 52 | 11 |
| 0810 | e0 | 2b | 7e | fe | 80 | 30 | 06 | 12 | 23 | 13 | 10 | f6 | c9 | cb | 71 | 28 |
| 0820 | f6 | 3e | 3f | 18 | f2 | 21 | 00 | 2a | ed | 5b | c0 | 2b | b7 | ed | 52 | 44 |
| 0830 | 4d | 62 | 6b | 23 | ed | b0 | 2a | c0 | 2b | cb | fe | c3 | 00 | 08 | 2a | c0 |
| 0840 | 2b | cb | be | 23 | cb | fe | 22 | c0 | 2b | c3 | 00 | 08 | 21 | 00 | 2a | ed |
| 0850 | 5b | c0 | 2b | b7 | ed | 52 | 44 | 4d | 21 | 00 | 2a | 54 | 5d | 2b | ed | b8 |
| 0860 | 3a | da | 2b | 2a | c0 | 2b | 77 | c3 | 3e | 08 | 2a | c0 | 2b | cb | be | 2b |
| 0870 | cb | fe | 22 | c0 | 2b | 00 | 00 | 00 | 00 | c3 | 00 | 08 | 3e | ef | 2a | c0 |
| 0880 | 2b | 01 | 00 | 16 | ed | b1 | 28 | 03 | 2a | c0 | 2b | 22 | 88 | 2b | 2a | c0 |
| 0890 | 2b | 22 | a8 | 2b | 22 | b4 | 2b | 21 | 00 | 00 | 22 | a4 | 2b | 22 | a6 | 2b |
| 08a0 | cd | b0 | 05 | c3 | 00 | 08 | 2a | c0 | 2b | cb | be | 21 | 00 | 14 | 22 | c0 |
| 08b0 | 2b | c3 | 00 | 08 | 21 | 02 | 09 | 22 | d8 | 2b | c9 | 00 | 3a | da | 2b | 3c |
| 08c0 | 87 | 87 | 87 | 87 | 87 | 32 | 93 | 2b | c9 | 00 | 00 | 00 | 3a | da | 2b | fe |
| 08d0 | 14 | 28 | 0a | fe | 27 | 28 | 0c | 21 | ea | 08 | c3 | b7 | 08 | 21 | de | 2b |
| 08e0 | cb | a6 | c9 | 21 | de | 2b | cb | e6 | c9 | 00 | 00 | 13 | 88 | 3e | 12 | 88 |
| 08f0 | 6a | 14 | 88 | 25 | 11 | 88 | b4 | 10 | 88 | 4c | 15 | 88 | 7c | 19 | 88 | a6 |
| 0900 | 88 | 4c | 00 | 00 | 88 | bc | 1e | 88 | cc | 88 | d7 | 3a | df | 28 | cb | 47 |
| 0910 | 20 | 06 | 19 | 7e | 32 | db | 28 | c9 | 3a | da | 28 | 18 | f7 | 53 | 8d | 64 |
| 0920 | ed | 5b | d4 | 28 | 21 | e0 | 28 | 06 | 20 | 7a | f6 | 08 | d3 | 04 | 7e | e6 |
| 0930 | 7f | d3 | 09 | f6 | 80 | d3 | 09 | d3 | 09 | d3 | 09 | d3 | 09 | d3 | 09 | d3 |
| 0940 | 09 | d3 | 09 | 23 | 10 | e8 | 7b | f6 | 00 | d3 | 04 | 1d | 15 | 14 | 28 | 06 |
| 0950 | 15 | ed | 53 | d4 | 28 | c9 | 3a | df | 28 | cb | 7f | 20 | 08 | 11 | 04 | 04 |
| 0960 | ed | 53 | d4 | 28 | c9 | 16 | 04 | 7b | c6 | 05 | 5f | 28 | 06 | 1d | ed | 53 |
| 0970 | d4 | 28 | c9 | 21 | 7b | 15 | e5 | 2a | d2 | 28 | e9 | 11 | 08 | 04 | ed | 53 |
| 0980 | d4 | 28 | c9 | 2d | df | 96 | b7 | 69 | ca | 57 | 1d | 68 | ff | b6 | 9b | 34 |
| 0990 | 3a | df | 28 | 4f | 06 | 20 | 2a | c0 | 28 | 11 | 10 | 00 | b7 | ed | 52 | 11 |
| 09a0 | e0 | 28 | 7e | fe | 80 | 30 | 06 | 12 | 23 | 13 | 10 | f6 | c9 | cb | 71 | 28 |
| 09b0 | f6 | 3e | 3f | 18 | f2 | 8f | 54 | 00 | 2a | c0 | 28 | cb | be | 23 | cb | fe |
| 09c0 | 22 | c0 | 28 | c9 | 2a | c0 | 28 | cb | be | 2b | cb | fe | 22 | c0 | 28 | c9 |
| 09d0 | 21 | 00 | 28 | ed | 5b | c0 | 28 | b7 | ed | 52 | 44 | 4e | 62 | 6b | 23 | ed |
| 09e0 | b0 | 2a | c0 | 28 | cb | fe | c9 | 55 | 54 | 52 | 98 | 6a | 18 | 00 | 00 | 00 |
| 09f0 | 21 | 00 | 28 | ed | 5b | c0 | 28 | b7 | ed | 52 | 44 | 4d | 21 | 00 | 28 | 54 |
| 0a00 | 21 | 00 | 0b | 11 | 00 | 2b | 01 | 00 | 01 | ed | b0 | c9 | b8 | 15 | a8 | 88 |
| 0a10 | 00 | 86 | b0 | cb | be | 2b | cb | fe | 22 | c0 | 28 | 3e | 20 | bc | f0 | c9 |

TABLE I-continued

| Memory Address | Memory Code | | | | | | | | | | | | | | | |
|---|---|---|---|---|---|---|---|---|---|---|---|---|---|---|---|---|
| 0a20 | 3e | 3f | 2a | c0 | 28 | 10 | 00 | 08 | ed | b1 | 28 | 03 | 2a | c0 | 28 | 22 |
| 0a30 | 88 | 28 | 2a | c0 | 28 | 22 | a8 | 28 | 22 | b4 | 28 | 21 | 00 | 00 | 22 | a4 |
| 0a40 | 28 | 22 | a6 | 28 | cd | 00 | 1b | c9 | 2a | c0 | 28 | cb | be | 21 | 00 | 23 |
| 0a50 | 22 | c0 | 28 | c9 | 3e | 38 | 6e | 02 | 21 | 2f | 1e | 22 | d8 | 28 | c9 | 00 |
| 0a60 | 3a | da | 28 | 3c | 87 | 87 | 87 | 87 | 87 | 32 | 93 | 28 | c9 | 00 | 00 | 00 |
| 0a70 | 3a | da | 28 | fe | 14 | 28 | 0a | fe | 27 | 28 | 0c | 21 | ff | 1d | c3 | 5b |
| 0a80 | 16 | 21 | de | 28 | cb | a6 | c9 | 21 | de | 28 | cb | e6 | c9 | d9 | ce | da |
| 0a90 | 5c | 4d | 98 | 75 | be | 32 | 97 | 08 | 37 | 3d | 77 | a8 | b7 | 08 | ee | e5 |
| 0aa0 | bd | ab | aa | f1 | 85 | 87 | 63 | 1f | a8 | c3 | 06 | 82 | b9 | b0 | 34 | b8 |
| 0ab0 | 65 | 73 | 06 | a2 | e4 | ef | 54 | 23 | 3b | bb | 2c | c3 | 2e | ff | c5 | 57 |
| 0ac0 | 0c | af | f4 | 2d | e0 | 85 | 5c | ce | ce | 9b | d7 | 3d | 9a | 1d | 76 | 11 |
| 0ad0 | ca | df | 77 | 30 | ef | b9 | 27 | de | fe | cd | 4a | 01 | 9d | 5e | ee | ec |
| 0ae0 | fc | 2a | 63 | 25 | 0f | 6e | 7f | 82 | 64 | 05 | a1 | bd | 6e | 61 | 35 | 23 |
| 0af0 | 7d | 7f | a1 | 2b | b4 | 78 | 23 | 46 | 65 | e4 | 00 | f6 | 01 | 41 | 02 | b7 |
| 0b00 | 44 | 00 | 42 | 00 | 40 | 00 | 36 | 00 | 34 | 00 | 32 | 00 | 30 | 00 | 36 | 00 |
| 0b10 | 34 | 00 | 32 | 00 | 30 | 00 | 26 | 00 | 24 | 00 | 22 | 00 | 20 | 00 | 26 | 00 |
| 0b20 | 24 | 00 | 22 | 00 | 20 | 00 | 16 | 00 | 14 | 00 | 12 | 00 | 10 | 00 | 16 | 00 |
| 0b30 | 14 | 00 | 12 | 00 | 10 | 00 | 06 | 00 | 04 | 00 | 02 | 00 | 00 | 00 | 70 | 06 |
| 0b40 | 04 | 00 | 02 | 00 | 00 | 00 | 80 | 00 | 86 | 00 | 84 | 00 | 82 | 00 | 80 | 00 |
| 0b50 | 76 | 00 | 74 | 00 | 72 | 00 | 70 | 00 | 76 | 00 | 74 | 00 | 72 | 00 | 70 | 00 |
| 0b60 | 66 | 00 | 64 | 00 | 62 | 00 | 60 | 00 | 66 | 00 | 64 | 00 | 2a | 01 | 60 | 00 |
| 0b70 | 56 | 00 | 54 | 00 | 52 | 00 | 00 | 00 | 00 | 00 | 00 | 00 | 00 | 00 | 00 | 00 |
| 0b80 | 00 | 14 | 00 | 00 | 00 | 00 | 00 | 00 | 00 | 2a | 00 | 05 | 50 | 06 | 00 | 00 |
| 0b90 | 00 | 00 | 00 | 80 | 00 | 10 | 0a | 00 | 00 | 00 | 00 | 00 | 00 | 00 | 00 | 00 |
| 0ba0 | 00 | 00 | 00 | 00 | 00 | 00 | 00 | 00 | 00 | 00 | 00 | 00 | 00 | 00 | 00 | 00 |
| 0bb0 | 00 | 00 | 00 | 00 | 00 | 14 | 00 | 7f | 00 | 00 | 00 | 14 | 00 | 00 | 00 | 00 |
| 0bc0 | 00 | 14 | 00 | 00 | 00 | 00 | 00 | 00 | 00 | 00 | 00 | 00 | 00 | 00 | 00 | 00 |
| 0bd0 | 00 | 00 | 3e | 08 | 04 | 04 | 10 | 02 | ea | 08 | 76 | 00 | 74 | 00 | 00 | 00 |
| 0be0 | 3b | 3b | 3b | 3b | 3b | 3b | 3b | 3b | 3b | 3b | 3b | 3b | 3b | 3b | 3b | 3b |
| 0bf0 | 3c | 3b | 3b | 3b | 3b | 3b | 3b | 3b | 3b | 3b | 3b | 3b | 3b | 3b | 3b | 3b |
| 8000 | 7e | e5 | 01 | 19 | 00 | 21 | 52 | 80 | ed | b1 | 28 | 25 | 01 | 1b | 00 | ed |
| 8010 | b1 | 28 | 37 | fe | ed | 28 | 0c | fe | dd | 28 | 1a | fe | fd | 28 | 16 | 06 |
| 8020 | 01 | e1 | c9 | e1 | e5 | 23 | 7e | 21 | 88 | 80 | 01 | 06 | 00 | ed | b1 | 28 |
| 8030 | 1d | 06 | 02 | 31 | c9 | e1 | e5 | 23 | 7e | 21 | 90 | 80 | 01 | 05 | 00 | ed |
| 8040 | b1 | 28 | 0b | 01 | 0e | 00 | ed | b1 | 28 | e7 | 06 | 03 | e1 | c9 | 06 | 04 |
| 8050 | e1 | c9 | 06 | 0e | 10 | 16 | 18 | 1e | 20 | 26 | 28 | 2e | 30 | 36 | 38 | 3e |
| 8060 | c6 | ce | d3 | d6 | db | de | e6 | ee | f6 | fe | cb | cb | cb | 01 | 11 | 21 |
| 8070 | 22 | 2a | 31 | 32 | 3a | c2 | c3 | c4 | ca | cc | cd | d2 | d4 | da | dc | e2 |
| 8080 | e4 | ea | ec | f2 | f4 | fa | fc | fc | 43 | 4b | 53 | 5b | 73 | 7b | 7b | 7b |
| 8090 | cb | 21 | 22 | 2a | 36 | 36 | 36 | 36 | 09 | 19 | 23 | 29 | 2b | 39 | e1 | e3 |
| 80a0 | e5 | e9 | f9 | 00 | cd | ab | 80 | cd | ab | 80 | c9 | cd | bc | 00 | fe | ff |
| 80b0 | 28 | 18 | 21 | e8 | 03 | 01 | 10 | 00 | ed | b1 | 20 | 09 | 3e | 0f | 91 | 21 |
| 80c0 | db | 2b | ed | 6f | c9 | d1 | d1 | c3 | 9c | 00 | 11 | 10 | 02 | df | c3 | ab |
| 80d0 | 80 | 3e | cf | d3 | 07 | 3e | 40 | d3 | 07 | 21 | 00 | 00 | 3e | f8 | d3 | 05 |
| 80e0 | 06 | 08 | cb | 04 | 38 | 04 | cb | 8f | 18 | 02 | cb | cf | cb | 87 | d3 | 05 |
| 80f0 | db | 05 | cb | 77 | 20 | 03 | b7 | 18 | 01 | 37 | cb | 13 | cb | c7 | d3 | 05 |
| 8100 | 10 | e0 | cb | 7f | 28 | 04 | cb | bf | 18 | 08 | f5 | 7b | ba | c2 | 75 | 81 |
| 8110 | 18 | 01 | f5 | e5 | 2a | c0 | 2b | 7e | 57 | 23 | 22 | c0 | 2b | 31 | f1 | 06 |
| 8120 | 08 | cb | 87 | d3 | 05 | cb | 05 | 38 | 04 | cb | 8f | 18 | 02 | cb | cf | cb |
| 8130 | 87 | cb | 02 | 38 | 04 | cb | a7 | 18 | 02 | cb | e7 | d3 | 05 | cb | c7 | d3 |
| 8140 | 05 | 10 | de | cb | d7 | cb | 87 | d3 | 05 | 01 | d4 | 30 | 0d | 20 | fd | 05 |
| 8150 | 20 | fa | cb | 97 | d3 | 05 | cb | 9f | d3 | 05 | cb | af | d3 | 05 | cb | ef |
| 8160 | d3 | 05 | cb | df | d3 | 05 | 44 | 4d | 21 | ff | 07 | b7 | ed | 42 | c8 | 60 |
| 8170 | 69 | 23 | c3 | e0 | 80 | c9 | 3e | f8 | d3 | 05 | 2a | c0 | 2b | cd | 00 | 80 |
| 8180 | cd | 5f | 03 | cd | bc | 00 | 3d | 5b | d6 | 2b | cd | 18 | 00 | 3a | da | 2b |
| 8190 | fe | 3f | 20 | ef | 3e | 0f | d3 | 07 | 3e | ff | d3 | 05 | c0 | 3e | 48 | d3 |
| 81a0 | 04 | 01 | 00 | 0f | c5 | cd | c0 | 81 | c1 | 0b | af | b8 | 20 | f6 | cd | c0 |
| 81b0 | 81 | 30 | fb | cd | db | 81 | 23 | e5 | b7 | ed | 52 | e1 | 28 | 18 | 18 | f3 |
| 81c0 | db | 04 | 4f | db | 04 | b9 | 28 | fb | 4f | 06 | 1e | db | 04 | b9 | 20 | 04 |
| 81d0 | 10 | f9 | b7 | c9 | 37 | c9 | 3e | 08 | d3 | 04 | c9 | 06 | 08 | c5 | cd | c0 |
| 81e0 | 81 | c1 | cb | 16 | 10 | f7 | c9 | cd | a4 | 80 | 3a | db | 2b | 2a | c0 | 2b |
| 81f0 | 23 | 77 | cd | bb | 01 | 18 | f0 | 3e | 08 | d3 | 04 | 21 | df | 2b | c9 | ff |
| 8200 | eb | af | ed | 52 | eb | 4e | ed | 73 | 66 | 2b | d9 | 08 | 21 | 1a | 82 | 01 |
| 8210 | 60 | 09 | 11 | 00 | 80 | 3e | 28 | d3 | 04 | e9 | 1b | ba | da | 22 | 82 | c3 |
| 8220 | 2f | 82 | 2e | 1a | c3 | 37 | 82 | 05 | d9 | cb | 01 | d0 | d2 | 35 | 82 | 2e |
| 8230 | 3b | 31 | a1 | 82 | c0 | 2e | 27 | 31 | bd | 82 | c9 | 2e | 27 | 19 | 00 | 00 |
| 8240 | 00 | c3 | 31 | 82 | 3e | 08 | d3 | 04 | ed | 7b | 66 | 2b | c9 | 05 | 20 | 08 |
| 8250 | 06 | 09 | d9 | 1b | 23 | 4e | d9 | c9 | 04 | 0e | 60 | c3 | 5e | 82 | 00 | 00 |
| 8260 | c9 | d9 | 08 | ba | ca | 6c | 82 | d9 | 0e | 60 | 08 | c9 | d9 | 23 | 44 | 08 |
| 8270 | c9 | 00 | 00 | 00 | 00 | 00 | 00 | 00 | 00 | 00 | 00 | 00 | 00 | 00 | 00 | 00 |
| 8280 | c3 | 9c | 82 | 00 | 00 | 00 | 00 | 00 | 00 | 00 | 00 | 00 | 00 | 00 | 00 | 00 |
| 8290 | 00 | 00 | 00 | 00 | 00 | 00 | 00 | 18 | 02 | 0e | 60 | ee | 10 | d3 | 04 |
| 82a0 | c9 | 91 | 82 | 9c | 82 | 4d | 82 | 7c | 82 | 95 | 82 | 76 | 92 | 75 | 82 | 96 |
| 82b0 | 82 | 61 | 82 | 79 | 82 | 9c | 82 | 83 | 82 | 9c | 82 | 19 | 82 | 9a | 82 | 92 |
| 82c0 | 82 | 8a | 82 | 79 | 82 | 72 | 82 | 91 | 82 | 73 | 82 | 90 | 82 | 74 | 82 | 8f |
| 82d0 | 82 | 75 | 82 | 8e | 82 | 76 | 82 | 8d | 82 | 77 | 82 | 8c | 82 | 78 | 82 | 8b |
| 82e0 | 82 | 79 | 92 | 4d | 82 | 98 | 82 | 92 | 82 | 61 | 82 | 7d | 82 | 92 | 82 | 71 |
| 82f0 | 82 | 92 | 82 | 19 | 82 | d5 | 1a | 13 | 23 | e6 | 7b | be | 28 | f8 | 33 | 7f |
| 8300 | 1b | be | 38 | 08 | 23 | be | 30 | fc | 23 | d1 | 18 | e9 | 7e | 23 | 6e | e6 |
| 8310 | 7f | 67 | c1 | c9 | 32 | da | 2b | e6 | 3f | 6f | 26 | 00 | ed | 5b | 3e | 2b |

TABLE I-continued

| Memory Address | Memory Code | | | | | | | | | | | | | | | |
|---|---|---|---|---|---|---|---|---|---|---|---|---|---|---|---|---|
| 8320 | 3a | df | 2b | cb | 47 | 20 | 06 | 19 | 7e | 32 | db | 2b | c9 | 3a | da | 2b |
| 8330 | 18 | f7 | 2d | 81 | b7 | 1d | 81 | c4 | 3b | 81 | ca | 0d | 81 | dd | 3e | 81 |
| 8340 | f6 | 0f | 82 | 13 | 1f | 82 | 1a | 2e | 82 | 37 | 1e | 82 | 4f | 3d | 82 | 6e |
| 8350 | 1a | 82 | 8a | 11 | 82 | 9d | 3f | 82 | b1 | 26 | 82 | db | 29 | 83 | 0c | 2f |
| 8360 | 83 | f8 | 3c | 80 | 00 | 0e | 80 | 6b | 81 | c3 | ff | ff | ff | 03 | 0a | cf |
| 8370 | f0 | 07 | 02 | 0b | 0f | 07 | 03 | 06 | cf | 80 | 07 | 02 | 07 | 0f | 07 | 01 |
| 8380 | 05 | ff | 01 | 04 | 08 | cd | f9 | 00 | 21 | c4 | 2b | cb | 7e | 28 | 05 | 3e |
| 8390 | 08 | d3 | 04 | c9 | 3e | 68 | d3 | 04 | 18 | eb | 00 | 00 | 00 | 00 | 00 | 00 |
| 83a0 | 00 | 00 | 00 | 00 | 00 | 00 | 00 | 00 | 00 | ff | 00 | 00 | 00 | 00 | 00 | 00 |
| 83b0 | 00 | 00 | 00 | 00 | 00 | 14 | 00 | 00 | 00 | 00 | 00 | 14 | 00 | 00 | 00 | 00 |
| 83c0 | 00 | 14 | ff | ff | ff | ff | ff | ff | ff | ff | ff | ff | ff | ff | ff | ff |
| 83d0 | ff | ff | 91 | 01 | 04 | 04 | 10 | 02 | 31 | 83 | ff | ff | 00 | 00 | 00 | 01 |
| 83e0 | 3b | 3b | 3b | 3b | 3b | 3b | 3b | 3b | 3b | 3b | 3b | 3b | 3b | 3b | 3b | 3b |
| 83f0 | 3b | 3b | 3b | 3b | 3b | 3b | 3b | 3b | 3b | 3b | 3b | 3b | 3b | 3b | 3b | 3b |
| 8400 | 3a | de | 2b | e6 | 3c | 47 | 32 | de | 2b | 21 | 90 | 2b | 3a | b7 | 2b | be |
| 8410 | 28 | 29 | da | 84 | 87 | 3a | b1 | 2b | 96 | ed | 44 | fa | 00 | 00 | 2a | b0 |
| 8420 | 2b | 22 | b6 | 2b | 2a | b2 | 2b | 22 | b8 | 2b | 2a | b4 | 2b | 22 | ba | 2b |
| 8430 | 21 | 00 | 00 | 22 | a1 | 2b | 22 | 9f | 2b | 18 | 20 | 21 | de | 2b | cb | c6 |
| 8440 | 2a | be | 2b | ed | 5b | 8e | 2b | b7 | 3d | 52 | 38 | 55 | 2a | a1 | 2b | 22 |
| 8450 | 9d | 2b | 2a | 9f | 2b | 22 | 9b | 2b | 21 | 00 | 00 | 22 | 99 | 2b | 21 | de |
| 8460 | 2b | cb | ae | 2a | b6 | 2b | 22 | bc | 2b | 2a | b8 | 2b | 22 | be | 2b | 2a |
| 8470 | ba | 2b | 22 | c0 | 2b | 18 | 3c | 3a | ab | 2b | 21 | bd | 2b | be | 28 | 21 |
| 8480 | 2a | be | 2b | ed | 5b | 93 | 2b | b7 | ed | 52 | 38 | 15 | 2a | bc | 2b | 22 |
| 8490 | aa | 2b | 2a | a6 | 2b | 22 | ac | 2b | 2a | c0 | 2b | 22 | ae | 2b | c3 | 09 |
| 84a0 | 86 | 2a | a4 | 2b | 22 | bc | 2b | 2a | a6 | 2b | 22 | be | 2b | 2a | a8 | 2b |
| 84b0 | 22 | c0 | 2b | cd | bc | 86 | 21 | de | 2b | 46 | 2e | a3 | 7e | 4f | cb | 50 |
| 84c0 | 20 | 41 | e6 | 0f | fe | 0a | 38 | 14 | 79 | fe | 3b | 28 | 5c | f3 | 1c | 20 |
| 84d0 | 07 | 3e | 3b | 32 | a3 | 2b | 18 | 51 | fe | 0a | 28 | 07 | cb | 40 | c2 | e5 |
| 84e0 | 85 | 18 | 94 | cb | 40 | 28 | 4e | 2a | ae | 2b | ed | 5b | c0 | 2b | b7 | ed |
| 84f0 | 52 | ca | e5 | 85 | 2a | be | 2b | 22 | a6 | 2b | 3a | bc | 2b | 32 | a4 | 2b |
| 8500 | c3 | 77 | 84 | cb | 40 | c2 | e5 | 85 | 79 | fe | 1c | c2 | 77 | 84 | 2a | bc |
| 8510 | 2b | 22 | aa | 2b | 2a | be | 2b | 22 | ac | 2b | 2a | c0 | 2b | 22 | ae | 2b |
| 8520 | 21 | 00 | 00 | 22 | 9f | 2b | c3 | 09 | 86 | cb | 40 | c2 | b1 | 85 | 2a | be |
| 8530 | 2b | cb | b0 | 18 | 05 | cb | f0 | sa | a6 | 2b | 78 | 32 | de | 2b | eb | 2a |

Figures 6, 6A:
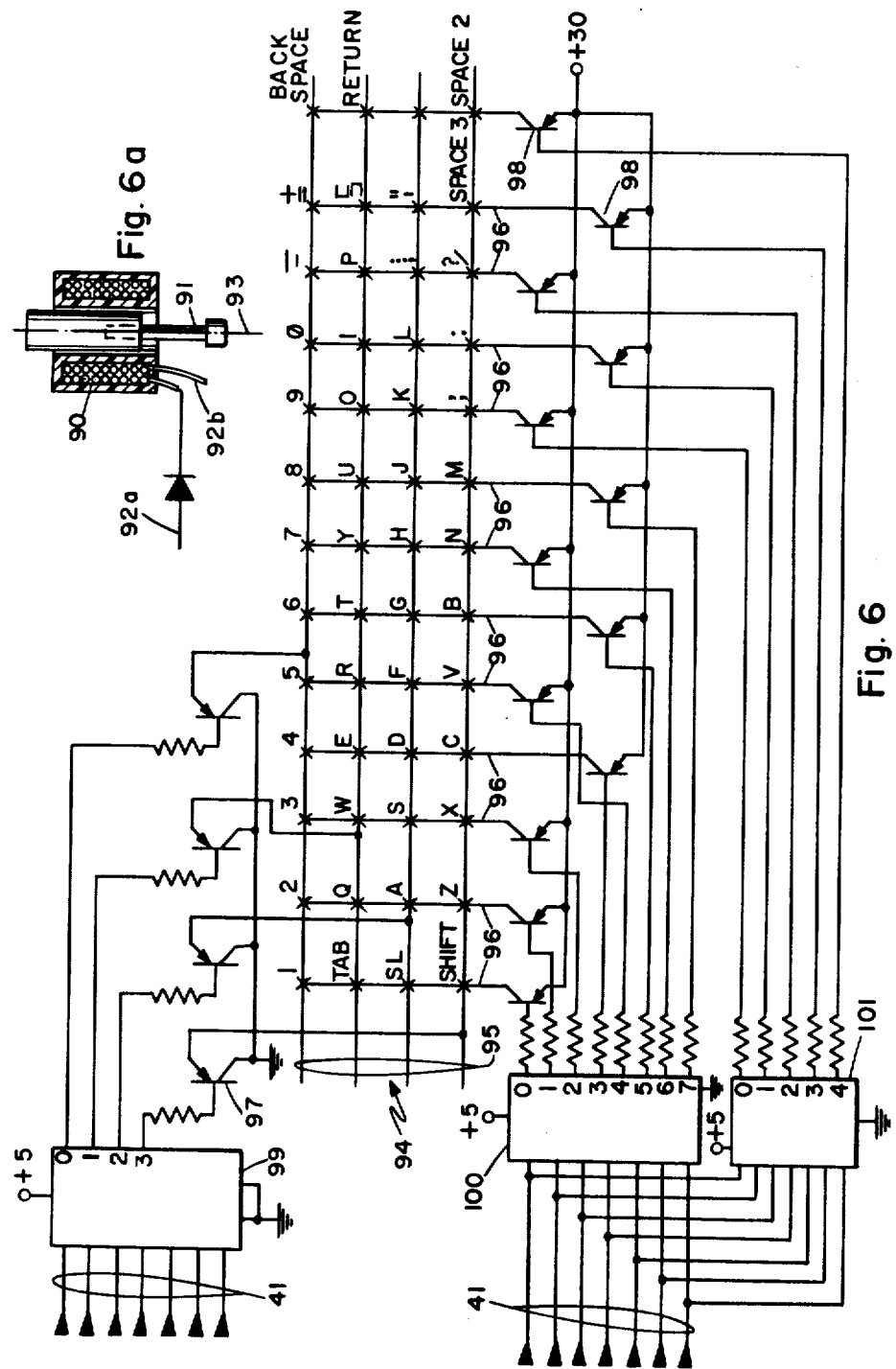
FIG. 6 is a detailed circuit diagram of the keypusher of FIG. 3.

The details of keypusher 12 will now be described in conjunction with FIG. 6. Keypusher 12 is comprised of a plurality of solenoids 90 and corresponding solenoid operated pushrods 91. Each solenoid 90 has a pair of terminals 92a and 92b; and pushrod 92 moves in response to signals applied thereto. Specifically, pushrod 90 moves out of solenoid 90 along an axis 93 when solenoid 90 is energized, and retreats back into solenoid 90 when it is de-energized.

The solenoids 90 are packaged in an array 94 on a rigid mechanical assembly such that pushrods 91 align with corresponding keys on typewriter 22 when the assembly is mounted thereon. Array 94 includes row leads 95 and column leads 96. Terminals 92a and 92b respectively of each solenoid in array 94 connect to a corresponding pair of row-column leads. The row-column leads in turn connect to transistors 97 and 98 which selectively provide drive current for solenoids 90.

A decoder chip 99 decodes signals on leads 41 to logically select transistors 97. Similarly, decoder chips 100 and 101 also decode signals on leads 41 to logically select transistors 98. Suitably, chips 99, 100, and 101 are 1K×8 bit ROM chips as used in memory 32. By this configuration, the output signals on leads 41 are easily adapted to drive any office typewriter regardless of the relative position of the keys thereon. That is, by changing the ROM code in chips 99–101, a particular code on leads 41 can be made to push any key. The combination is in fact general enough to operate typewriters of a foreign language. The language can have any number of alphabets and the typewriter any number of keys. Chips 99–101 simply are coded to make the correspondence between the signals on leads 41 and the keys to be pushed.

Figures 7, 7A:
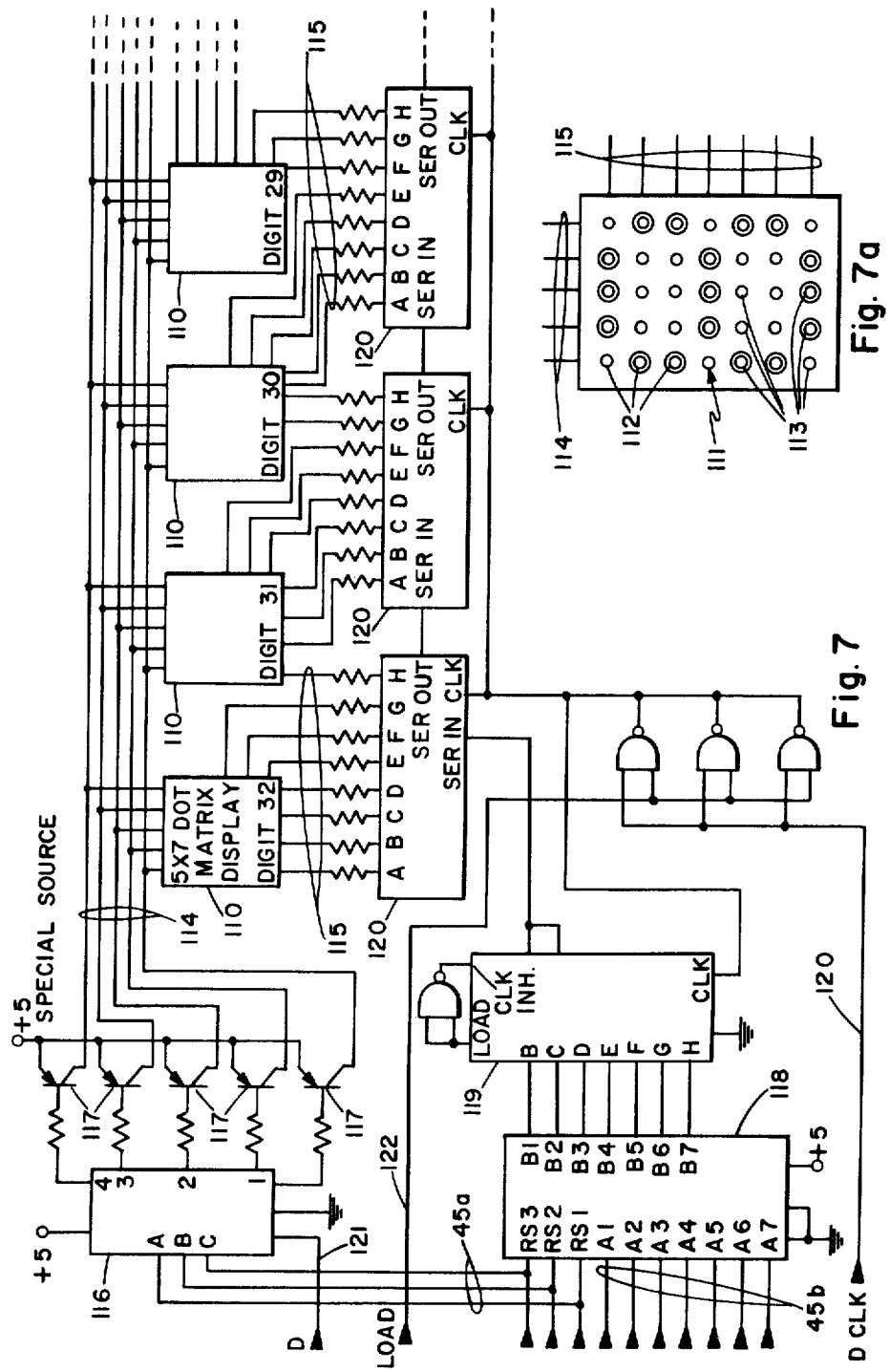
FIG. 7 is a detailed circuit diagram of the display of FIG. 3.

Referring now to FIG. 7, display 17 will be described in detail. Included therein are thirty-two display chips 110, only the first four of which are illustrated. Chips 110 each contain a thirty-five light emitting diode 111. These diodes are arranged in five columns 112 and seven rows 113. Leads 114 couple to columns 112; and leads 115 couple to rows 113. In operation, any particular diode 111 is made to emit light by applying a signal to the corresponding row-column lead pair. Alphanumeric characters are displayed by sequentially applying signals to the row and column lines which correspond to the character to be displayed. FIG. 7a illustrates how the number eight would be displayed for example.

A 3×8 decoder chip 116 in combination with drive transistors 117 provide a means for applying signals to column lines 114. Similarly, a decoder chip 118, a parallel-serial shift register 119, and a string of serial-parallel shift registers 120 provide a means of applying signals to row lines 115. Leads 45a and 45b connect the input of chips 116 and 118 to allow processor 30 to supply signals thereto for control of the display.

Processor 30 does this by first loading the column select signal onto leads 45a, and then by sequentially outputting the data characters that are to be displayed on leads 45b. Clock leads 120 and 121, and Load/Shift lead 122 provide the synchronizing signals. Decoder chip 118 translates the signals on leads 45a and 45b into the row select signals which correspond to the column of the character to be displayed. Suitably, decoder chip 118 is a 1K×8 ROM chip as was used for memory 32.

Thus, by utilizing the circuit of FIG. 7, processor 30 is freed from translating the data words in memory 31 into row-column select signals for the display. Further, the circuit of FIG. 7 is general enough to display edited data words in various languages. All that is required to change the translating code is chip 118. The micro-program routines in processor 30 which drive display 17 remains unchanged.

Figure 8A:
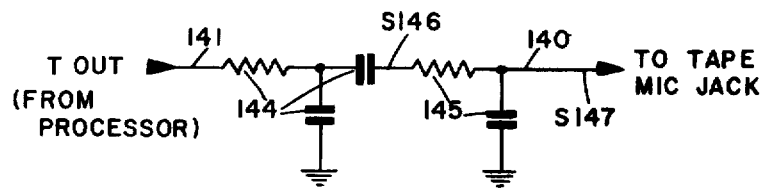
FIG. 8 is a detailed circuit diagram of the tape interface of FIG. 3.
Figure 8B:
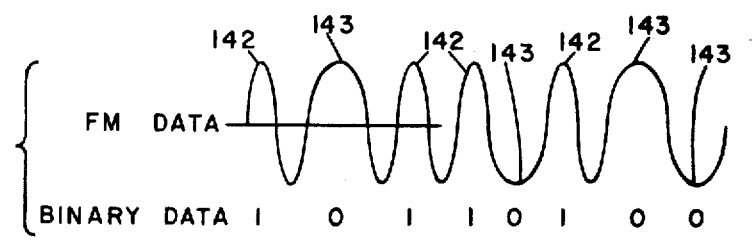
Figure 8C:
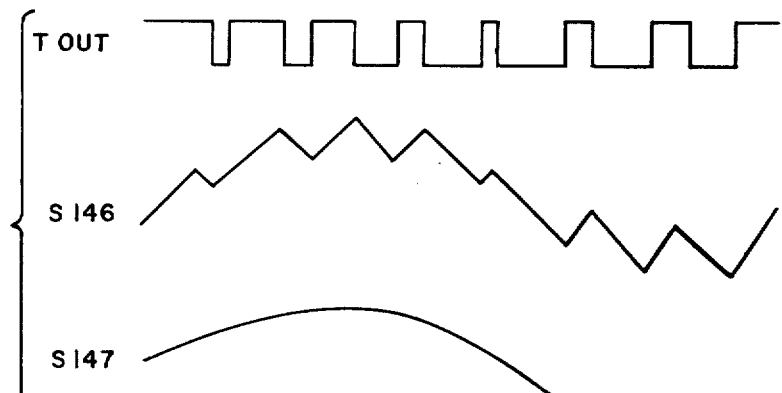
Figure 8D:
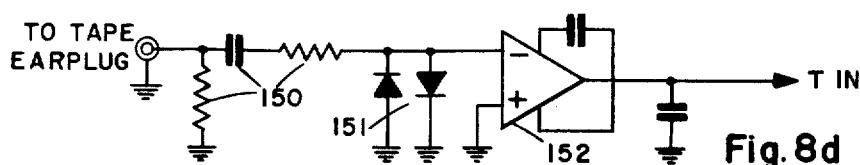

The tape recorder interface will now be described in conjunction with FIG. 8. It includes leads 140 and 141 on which is sent data to be written onto tape 20. Preferably, this data is written in a frequency modulated format. A full cycle 142 of one frequency represents a logical 1; whereas a half cycle 143 of half that frequency represents a logical 0. FIG. 8b illustrates this format for the binary data 10110100 as an example.

Signals of this modulated format are generated by processor 30 by means of the circuitry connected between leads 140 and 141 as illustrated in FIG. 8. This circuitry consists of an integrator 144 and a smoothing filter 145. Signal TOUT is a digital output that is generated by processor 30 on lead 141. The integral of signal TOUT is signal S146 which is a quantitized version of the desired frequency modulated signal. Signal S146 is smoothed by filter 145 to produce an FM signal on S147 on lead 140 that contains only the "1" and "0" frequencies. Accordingly, the circuit of FIG. 8 provides a means for processor 30 to create a frequency modulated signal simply by varying the width of the pulses comprising signal TOUT. This circuit has relatively few components, but enables processor 30 to digitally generate practically any desired analog waveform.

The readings of tape recorder 21 involves the conversion of the analog signals stored thereon back into digital signals. The circuit of FIG. 8d performs this function. This circuit includes a phase shifter 150, a limiter 151, and a level shifter 152. In operation, phase shifter 150 compensates for a phase shift of approximately 90 degrees which tape recorder 20 inserts while recording. Limiter 151 chops the swing of the signals output from phase shifter 150 such that they only vary between approximately +0.5 volts and −0.5 volts. Level shifter 152 converts the =0.5 volt signals to +0.5 volts, and the −0.5 volt signals to 0 volts. The output of level shifter 152 therefore is logic levels that comprise signal TIN which processor 30 receives.

Figure 8E:
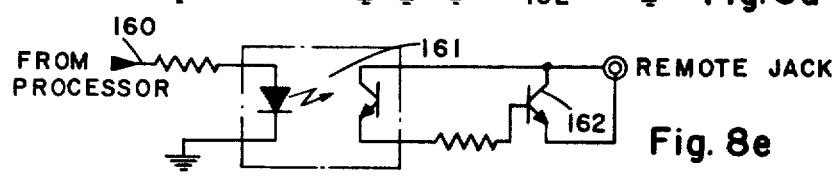

The movement of the tape on recorders 20 and 21 is controlled by processor 30 by means of the circuit of FIG. 8e. One such circuit controls the tape movement on recorder 20; and another identical circuit controls the tape movement on recorder 21. To move a tape, processor 30 simply sets a logical high signal on lead 160. That lead connects to the input of an optical-isolator 161. The output transistor of isolator 161 conducts in response to the high signal on lead 160. This in turn enables transistor 162 to conduct. The terminals of transistor 162 connect to respective terminals on recorders 20 and 21, which when conductively connected together cause the tape on the recorder connected thereto to move.

Particular preferred embodiments of a text editor constructed according to the invention have now been described in detail. The illustrated preferred embodiments perform text editing on any standard office typewriter. Further, they are portable and thus are useable both in and away from the office. In addition, the device is readily adaptable to edit text of various languages.

Many changes and modifications can be made to the illustrated embodiments without departing from the invention embodied therein. For example, additional tape interfaces may be added to acquire a larger memory capacity. As another example, various other kinds of text editing functions may be defined by utilizing the disclosed hardware and modifying memory 32 accordingly. Therefore, since many changes and modifications can be made to the disclosed embodiments without departing from the nature and spirit of the invention, it is to be understood that the invention is not limited to said embodiments but is defined by the appended claims.

Having described my invention, I claim:

1. A text editing device comprising:

a portable case;

input keyboard means mounted within the case having manually depressable data keys and control keys for respectively generating data input signals and control input signals representative of the keys as they are depressed;

display means mounted within the case for visually displaying a sequence of alphanumeric characters including a predetermined number of individual visual display chips arranged in side by side fashion, each display chip adated for displaying a predetermined alphanumeric character in response to predetermined display signals applied thereto;

digital control means mounted within the case and coupled to the keyboard means and the display means for receiving the data input signals, for storing digital data words representative of the data input signals, and for generating input visual display signals representative of the data input signals, and further for performing predetermined editing operations on the data words in response to respective ones of the control input signals to thereby generate edited data words, output control signals representative of the edited data words, and output visual display signals representative of the edited data words, the control means including, a microprocessor, a first digital memory coupled to the microprocessor for storing the data words and the edited data words therein, and a second digital memory coupled to the microprocessor for holding microprograms to perform the editing operations on the data words;

tape recorder means for writing and reading frequency modulated signals representative of the edited data words;

interface means for operatively coupling the digital control means and the tape recorder means together including:

passive integrator means for integrating bit serial digital signals of varying pulse width from the digital control means representative of the edited data words to produce a smooth frequency modulated signal wherein a full cycle of a predetermined frequency represents a logical 1 and a half cycle of half the predetermined frequency represents a logical 0, and analog to digital conventor means for converting the frequency modulated signal read by the tape recorder means into bit serial digital signals of varying pulse width representative of the edited data words; and electromechanical keypusher means coupled to the digital control means for receiving the output control signals therefrom and adated to be mounted on an office typewriter for depressing keys thereon corresponding to the edited data words represented by the output control signals, whereby the edited data words will be converted into printed text.

2. A text editing device according to claim 1 wherein: each of the visual display chips includes a plurality of light emitting diodes arranged in rows and columns, each visual display chip further having a plurality of row and column leads connected to corresponding ones of its diodes so that a predetermined diode can be made to emit light by applying visual display signals to a predetermined pair of its row and column leads, and the digital control means further includes decoder means interconnected with the microprocessor and the row and column leads of the display chips for translating the data words and the edited data words into row-column select signals and means for applying the select signals to the row and column leads to thereby generate the input and the output visual display signals.

3. A text editing device according to claim 2 wherein the decoder means includes a replaceable read only memory chip for readily adapting the translation of the data words and the edited data words into different sets of predetermined row-column select signals suitable for displaying different languages on the display chips.

4. A text editing device according to claim 1 wherein: each of the keys of the keyboard means are provided with a pair of contacts, one contact of each pair being connected to a corresponding one of four row leads and the other contact of each pair being connected to a corresponding one of sixteen column leads upon depressing the key corresponding to that pair of contacts; and further wherein means are provided for permitting the microprocessor to continuously interrogate the row and column leads of the keyboard means to determine which of its keys have been depressed.

5. A text editing device according to claim 1 wherein the electromechanical keypusher means includes a plurality of solenoids each having a coil with a pair of terminals and a control movable core, a plurality of pushrods each connected to a core of one of the solenoids, means for supporting the solenoids in an array of rows and columns above the keys of the office typewriter so that each of the pushrods will operatively depress one of the keys when the solenoid to which it is connected is energized, a plurality of row and column leads connected to corresponding ones of the terminals so that a predetermined solenoid can be energized, a plurality of row and column leads connected to corresponding ones of the terminals so that a predetermined solenoid can be energized by applying output control signals to a predetermined pair of the row and column leads, and further wherein the digital control means further includes decoder means interconnected with the microprocessor and the row and column leads of the keypusher means for translating the output control signals into row-column select signals and for applying the select signals to the corresponding row and column leads to thereby cause the solenoids to be energized in the proper sequence for converting the edited data words into printed text.

6. A text editing device according to claim 5 wherein the decoder means includes at least one replaceable read only memory chip for readily adapting the translation of the output control signals into different sets of predetermined row-column select signals suitable for operating office typewriters having different alphabets.

7. A text editing device according to claim 2 wherein the means for applying the row-column select signals including a string of serial-parallel shift registers for applying row portions of the select signals to the row leads of the display chips.

8. A test editing device comprising:

a portable case configured in the general shape of a typewriter and having a keyboard region and a display region, the display region extending above the keyboard region along a major portion of the width of the case;

input keyboard means mounted within the case in the keyboard region and having manually depressable data keys and control keys for respectively generating data input signals and control input signals representative of the keys as they are depressed, each of the keys being provided with a pair of contacts, one contact of each pair being connected to a corresponding one of four row leads and the other contact of each pair being connected to a corresponding one of sixteen column leads upon depressing the key corresponding to that pair of contacts;

display means mounted within the case in the display region for visually displaying a modifiable and movable sequence of alphanumeric characters, the display means including a plurality of display chips mounted in side by side fashion in the display region, each of the chips including a plurality of light emitting diodes arranged in rows and columns, each display chip further having a second plurality of row and column leads connected to corresponding ones of its diodes so that a predetermined single illuminated symbol can be visually displayed by that chip by applying visual display signals to a predetermined pair of its row and column leads;

digital control means mounted within the case and coupled to the keyboard means and the display means for receiving the data input signals, for storing digital data words representative of the data input signals, and for generating input visual display signals representative of the data input signals, and further for performing predetermined editing operations on the data words in response to respective ones of the control input signals to thereby generate edited data words, output control signals representative of the edited data words, and output visual display signals representative of the edited data words, the editing operations being visually facilitated by a flashing cursor which shifts between different ones of the display chips in response to respective ones of the control input signals, and control means including, a microprocessor, a first digital memory coupled to the microprocessor for storing the data words and the edited data words therein, a second digital memory coupled to the microprocessor for holding microprograms to perform the editing operations on the data words, means for permitting the microprocessor to continuously interrogate the row and column leads of the keyboard means to determine which of its keys have been depressed, first decoder means interconnected with the microprocessor and the display chips for translating the data words and the edited words into first row-column select signals and means for applying the first row-column select signals to the row and column leads of the display chips to thereby generate the input and the output visual display signals, the first decoder means including a string of serial-parallel shift registers for applying the row portions of the first row-column select signals to the row leads of the display chips, and a first replaceable read only memory chip for readily adapting the translation of the data words and the edited data words into different sets of predetermined first row-column select signals suitable for displaying different languages on the display chips;

electromechanical keypusher means coupled to the digital control means for receiving the output control signals therefrom and adapted to be mounted on an office typewriter for depressing keys thereon corresponding to the edited data words represented by the output control signals thereby to convert the edited data words into printed text, the keypusher means including a plurality of solenoids each having a coil with a pair of terminals and a central movable core, a plurality of pushrods each connected to a core of one of the solenoids, means for supporting the solenoids in an array of rows and columns above the keys of the office typewriter so that each of the pushrods will operatively depress one of the keys when the solenoid to which it is connected is energized, a third plurality of row and column leads connected to corresponding ones of the terminals so that a predetermined solenoid can be energized by applying output control signals to a predetermined pair of the row and column leads of the electromechanical keypusher means;

the digital control means further including second decoder means interconnected with the microprocessor and the third plurality of row and column leads of the keypusher means for translating the output control signals into second row-column select signals and for applying the second row-column select signals to the corresponding row and column leads of the keypusher means to thereby cause the solenoids to be energized in the proper sequence for converting the edited data words into printed text, the second decoder means including a second replaceable read only memory chip for readily adapting the translation of the output control signals into different sets of predetermined second row-column select signals suitable for operating office typewriters having different alphabets;

tape recorder means for writing and reading frequency modulated signals representative of the edited data words; and interface means for operatively coupling the digital control means and the tape recorder means together including:

passive integrator means for integrating bit serial digital signals of varying pulse width from the digital control means representative of the edited data words to produce a smooth frequency modulated signal wherein a full cycle of a predetermined frequency represents a logical 1 and a half cycle of half the predetermined frequency represents a logical 0, and analog to digital converter means for converting the frequency modulated signal read by the tape recorder means into bit serial of varying pulse width representative of the edited data words.

* * * * *